Nov. 14, 1933.　　　　R. O. PERRINE　　　　1,934,948
APPARATUS FOR MEASURING FLOWS OF FLUIDS
Filed March 4, 1932　　　2 Sheets-Sheet 1
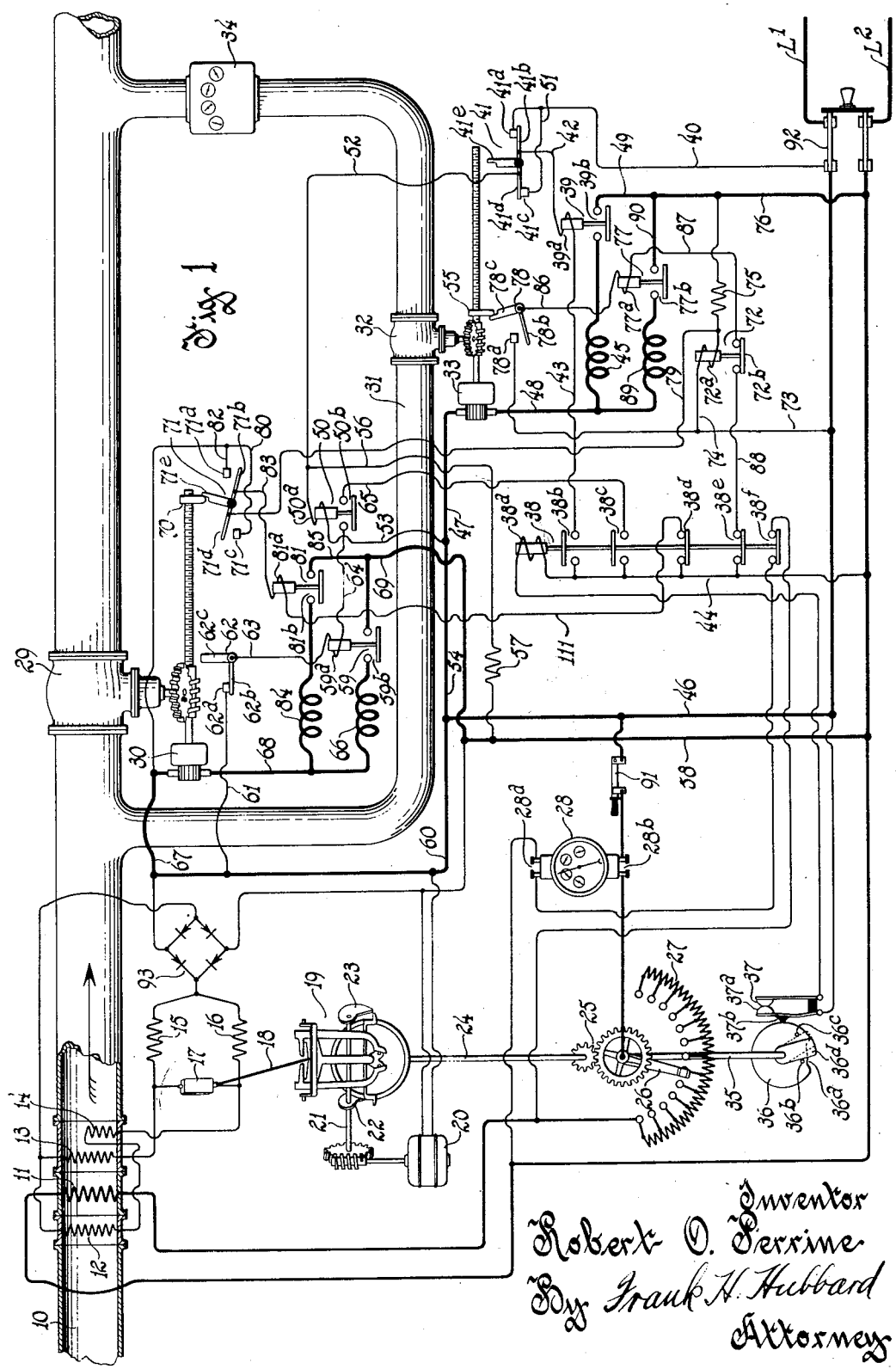

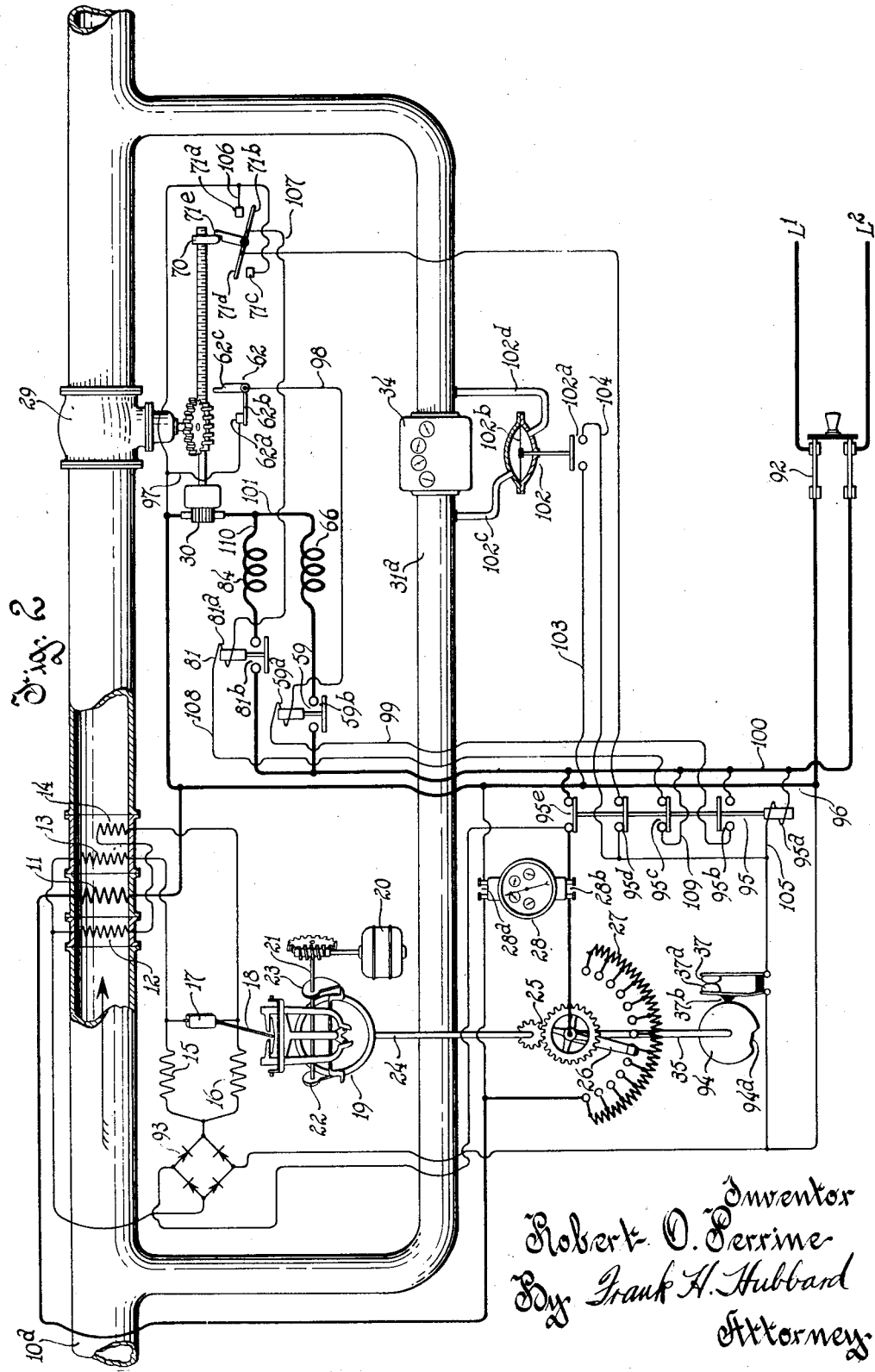

Patented Nov. 14, 1933

1,934,948

UNITED STATES PATENT OFFICE 1,934,948

APPARATUS FOR MEASURING FLOWS OF FLUIDS

Robert O. Perrine, Milwaukee, Wis., assignor to Cutler-Hammer, Inc., Milwaukee, Wis., a corporation of Delaware Application March 4, 1932. Serial No. 596,746

9 Claims. (Cl. 73—167)

This invention relates to improvements in apparatus for measuring flows of fluids.

It is customary in systems of the character herein contemplated to employ within the fluid conduit a meter of relatively large capacity which will function to accurately measure the flow of fluid so long as the volumetric rate of flow exceeds a predetermined relatively large value. When the volumetric rate of flow decreases to a relatively low value such large capacity meter is inherently incapable of functioning to accurately measure the flow.

It is therefore one of the objects of my invention to provide an apparatus for accurately measuring the fluid flow notwithstanding extremely wide variations in the volumetric rate of flow.

Another object is to provide an apparatus wherein a relatively small capacity meter of a positive displacement type is automatically rendered solely effective for measuring the flow when the volumetric rate thereof falls below a predetermined value.

Another object is to provide an apparatus wherein the meter of relatively large capacity is automatically rendered effective or ineffective for measuring the flow in response to variations in the volumetric rate of such flow.

Another object is to provide a novel system for effecting measurement of the fluid flow whereby in continuation of the flow is insured during transition of the measurement control from the meter of relatively large capacity to the meter of relatively small capacity, and vice versa.

Another and more specific object is to provide a fluid flow measuring system utilizing a relatively large capacity meter of the electric heat-exchange type and a relatively small capacity meter of the positive displacement type.

Other objects and advantages of the invention will hereinafter appear.

The accompanying drawings illustrate certain embodiments of the invention which will now be described, it being understood that the embodiments illustrated are susceptible of modification in the details of construction and operation thereof within the scope of the appended claims.

In the drawings, Figure 1 is a schematic and diagrammatic illustration of a control system embodying my invention, and Fig. 2 is a similar illustration of a modified form of control system embodying my invention.

Referring first to Fig. 1, the numeral 10 designates a main conduit through which a fluid (such as combustible gas) is adapted to flow from any suitable source (not shown). Located within conduit 10 is a relatively large capacity meter of a well known type. As shown I prefer to employ an electric fluid meter of the general character disclosed in Thomas Patent No. 1,222,492, dated April 10, 1917. In accordance with the teachings of said Thomas patent a variable amount of heat is supplied to the flow of fluid in conduit 10 through the medium of an electric heating element 11 to thereby provide a substantially constant rise in temperature of the fluid between thermometer resistances 12 and 13,—such rise in temperature being predetermined by the value of the temperature difference resistance 14 which is likewise preferably located within the stream of fluid. As shown the resistance thermometer 12 and temperature difference resistance 14 are connected to form one arm of a Wheatstone bridge, resistance thermometer 13 forms another arm of the bridge, and fixed resistances 15, 16 form the other two arms of the bridge. A galvanometer coil 17 is connected across said bridge in the usual manner,—the needle 18 of the galvanometer being deflectable in a sense and to a degree corresponding to the degree of unbalancing of the bridge circuit incident to variations in the volumetric rate of flow of the fluid.

A ratcheting device 19 of the character disclosed in Leeds Patent No. 1,125,699, dated January 19, 1915 is subjected to control in a well known manner by the needle 18. Said ratcheting device comprises in general a continuously operable electric motor 20 which drives a shaft 21 carrying cams 22 and 23 having associated clutch elements so arranged that the shaft 24 remains stationary so long as needle 18 is in an intermediate or neutral position, whereas upon deflection of needle 18 in one direction or the other shaft 24 is moved intermittently in a corresponding direction. Connected with shaft 24 through suitable gearing 25 is a contactor 26 forming a part of the adjustable rheostat 27, which as shown is connected in series with the heating element 11. The arrangement is such that upon increase in the volumetric rate of flow of fluid in conduit 10 contactor 26 is moved step-by-step in a clockwise direction to gradually exclude resistance from the circuit of element 11 whereby the value of current supplied to and the amount of heat generated by the latter is increased. In like manner upon a decrease in the volumetric rate of flow of fluid contactor 26 is moved step-by-step in a counterclockwise direction to increase the value of resistance 27 in circuit with element 11. The amount of heat supplied by element 11 is thus increased or decreased directly in accordance with variations in the volumetric rate of flow of the fluid.

An integrating wattmeter 28 is provided,—the same having its voltage coil connected in parallel with element 11, as indicated by terminals 28$^a$ and having its current coil connected in series with said element, as indicated by terminals 28$^b$. Wattmeter 28 thus operates in a well known manner to register in accordance with the total amount of energy supplied to element 11, and said wattmeter is calibrated to indicate directly the total volume of the fluid measured by the electric fluid meter.

Assuming that the electric fluid meter aforedescribed has a capacity for accurately measuring a flow of fluid having a maximum volumetric rate of flow of 100,000 cubic feet per hour, it will be understood that if the volumetric rate of flow decreases to a relatively small value, say, below 3,000 cubic feet per hour, such meter will not function as accurately as a meter of the positive displacement type. Accordingly, I provide within conduit 10 a valve 29 to be operated to an open or closed position selectively by means of an electric motor 30. Communicating with conduit 10 on opposite sides of valve 29 and arranged to by-pass the latter is a relatively small or branch conduit 31,—the same having interposed therein a relatively smaller gate valve 32 to be operated to an open or closed position selectively by means of an electric motor 33. Also interposed in branch conduit 31 at the outlet side of valve 32 is a meter 34 of the positive displacement type,—and it may be assumed that meter 34 has a maximum capacity of, say, 5,000 cubic feet per hour.

The elements now to be described are so arranged that upon a decrease in the volumetric rate of flow of fluid in conduit 10 to a value below, say, 3,000 cubic feet per hour the valve 32 will be operated automatically to effect full open positioning thereof and valve 29 will thereupon be operated automatically to effect full closed positioning thereof,—the voltage coil circuit of wattmeter 28 being interrupted to render the electric fluid meter ineffective for measuring the flow.

Under the conditions last mentioned, meter 34 will of course be rendered solely effective for measuring the flow of fluid. Although wattmeter 28 is rendered ineffective for registering the flow of fluid under these conditions, it will be noted that the other elements of the electric fluid meter remain active and responsive in the usual manner to variations in the volumetric rate of flow of the fluid. Thus upon an increase in the volumetric rate of flow of fluid to, say, 4,000 cubic feet per hour, or more, the control mechanism will function automatically to effect full open positioning of valve 29 and subsequent full closed positioning of valve 32,—the voltage coil circuit of wattmeter 28 being closed simultaneously to render the electric fluid meter solely effective for measuring the fluid flow. As aforeindicated the electric fluid meter will remain solely effective for measuring the flow when the volumetric rate of the latter is within the range of 100,000 and 3,000 cubic feet per hour, and the positive displacement meter 34 will remain solely effective for measuring the flow when the volumetric rate thereof is within the range of zero to 4,000 cubic feet per hour. The overlap of the ranges thus provided will minimize the number of transfers of measurement control from each meter to the other, as will be obvious.

More particularly, it will be noted that I have provided a shaft 35 which is connected for angular movement jointly with the rheostat contactor 26,—said shaft having fixed thereto a disk 36 having a relatively wide peripheral notch 36$^a$ located in a definite angular position with reference to contactor 26. Loosely mounted on shaft 35 closely adjacent to disk 36, and having a limited oscillatory movement with respect to the latter, between stops 36$^b$ and 36$^c$ is a member 36$^d$ which is arranged to overlie different portions of the notch 36$^a$, depending upon the direction of rotation of contactor 26 and disk 36 associated therewith. Located adjacent to disk 36 is a pair of contacts 37, 37$^a$,—the contact 37$^a$ being biased away from contact 37 to permit separation of said contacts when the cam projection 37$^b$ enters the notch 36$^a$,—said projection 37$^b$ being engageable with the periphery of disk 36 and with member 36$^d$ under given conditions to maintain contacts 37$^a$, 37 in engagement with each other.

Thus it may be assumed that with the parts in the positions illustrated valve 29 is fully open and valve 32 is fully closed to render the electric fluid meter solely effective for measuring the flow. Upon a decrease in the volumetric rate of flow to approximately 3,000 cubic feet per hour the contactor 26 will have moved counterclockwise to approximately its extreme right-hand position, and disk 36 and member 36$^d$ will have moved in a corresponding direction to such a degree that projection 37$^b$ will be permitted to enter the notch 36$^a$ on the left-hand side of member 36$^d$ as shown in full lines. Contact 37$^a$ will therefore disengage contact 37 to interrupt the energizing circuit of coil 38$^a$ of a relay 38. The contacts 38$^b$, 38$^c$ of relay 38 are thereupon closed and contacts 38$^d$, 38$^e$ and 38$^f$ are opened. Closure of contacts 38$^b$ completes a circuit for the operating coil 39$^a$ of a relay 39, said circuit extending from line L$^1$ by conductor 40 through contacts 41$^a$, 41$^b$ of a limit switch 41, conductor 42 through said coil 39$^a$, conductor 43 through said contacts 38$^b$, and by conductor 44 to line L$^2$.

Contacts 39$^b$ when closed complete an energizing circuit for the field winding 45 of motor 33 (which is of the split-field type) whereby the latter is operated in a direction to cause full open positioning of valve 32,—said circuit extending from line L$^1$ by conductors 46 and 47 through the armature of motor 33, conductor 48 through said field winding 45, thence through said contacts 39$^b$, and by conductor 49 to line L$^2$.

Also it will be noted that with the contacts 41$^c$, 41$^d$ of limit switch 41 in the closed position illustrated a short circuit is provided for the operating coil 50$^a$ of a relay 50, said short circuit extending from line L$^1$ by conductors 40 and 51 through said contacts 41$^c$, 41$^d$, conductor 52 through coil 50$^a$, and by conductors 53, 54 and 46 back to line L$^1$. Upon full open positioning of valve 32 the traveling nut 55 associated with the operating motor 33 will engage the lug 41$^e$ carried by said limit switch 41 to effect opening of the contacts 41$^a$, 41$^b$ and 41$^c$, 41$^d$ of the latter. Opening of contacts 41$^a$, 41$^b$ results in de-energization of relay 39 with consequent opening of contacts 39$^b$ of the latter for interruption of the aforedescribed circuit of motor 33. Opening of contacts 41$^c$, 41$^d$ of switch 41 results in interruption of the aforedescribed short circuit of coil 50$^a$ of relay 50. An energizing circuit is thus provided for said coil,—said circuit extending from line L$^1$ by conductors 46, 54 and 53 through said coil 50$^a$, conductors 52 and 56 through a suitable protective resistance 57, and by conductor 58 to line L².

Contacts 50ᵇ of relay 50 when closed complete an energizing circuit for the operating winding 59ᵃ of relay 59,—said circuit extending from line L¹ by conductors 46, 60 and 61 through the contacts 62ᵃ, 62ᵇ of a limit switch 62 associated with motor 30, conductor 63 through said winding 59ᵃ, conductor 64 through said contacts 50ᵇ, conductor 65 through contacts 38ᶜ of relay 38, and by conductor 44 to line L². Contacts 59ᵇ of relay 59 when closed complete an energizing circuit for the field winding 66 of motor 30 (which is also of the split-field type) whereby the latter is operated in a direction to cause full closed positioning of valve 29,—said circuit extending from line L¹ by conductors 46, 60 and 67 through the armature of said motor, conductor 68 through said field winding 66 and contacts 59ᵇ, and by conductors 69 and 58 to line L².

During closure of valve 29, the traveling nut 70 is moved out of engagement with projection 71ᵉ to permit closure of the contacts 71ᵃ, 71ᵇ and 71ᶜ, 71ᵈ of a limit switch 71 and to finally engage projection 62ᶜ of a limit switch 62 whereby the contacts 62ᵃ, 62ᵇ of the latter are disengaged to interrupt the circuit of motor 30.

Upon opening of the contacts 38ᶠ of relay 38 in the manner aforedescribed the circuit of the voltage coil of wattmeter 28 is broken thus rendering the latter incapable of registering the flow of fluid as measured by the electric fluid meter.

Associated with motor 33 is a relay 72 the operating coil 72ᵃ of which is provided with an energizing circuit which may be traced from line L¹ by conductors 73 and 74 through said coil, and through a protective resistance 75 and conductor 76 to line L². Relay 72 is provided with a set of normally open contacts 72ᵇ which are adapted when closed to pre-set an energizing circuit for the winding 77ᵃ of a relay 77, said circuit to be completed upon concurrent closure of the contacts 78ᵃ, 78ᵇ of limit switch 78 and contacts 38ᵉ of relay 38. As aforedescribed, however, contacts 38ᵉ will be opened due to de-energization of coil 38ᵃ prior to closure of contacts 78ᵃ, 78ᵇ of limit switch 78 when valve 32 is being moved to full open position. Moreover, it is to be noted that upon subsequent movement of valve 29 to closed position the contacts 71ᶜ, 71ᵈ of limit switch 71 will be closed automatically to provide a short-circuit for de-energizing coil 72ᵃ of relay 72 pending re-opening of said valve 29 in the manner hereafter described. Said short circuit may be traced from line L¹ by conductors 73 and 74 through said coil 72ᵃ, conductor 79, contacts 71ᵈ, 71ᶜ, and by conductors 80, 67, 60 and 46 back to line L¹.

With valve 32 fully opened and valve 29 fully closed in the manner aforedescribed to render meter 34 solely effective for measuring the flow (the electric fluid meter being rendered ineffective through interruption of the wattmeter voltage coil circuit through opening of contacts 38ᶠ of relay 38), it is to be noted that the other elements of the electric fluid meter remain active, and the same will respond to variations in the volumetric rate of flow of the fluid. Thus upon an increase in the volumetric rate of flow to, say, 4,000 cubic feet per hour, the electric fluid meter elements will cause automatic movement of contactor 26 in a clockwise direction to correspondingly increase the rate of electrical energy supply to heater element 11. Moreover, due to the reverse movement of disk 36, the member 36ᵈ will be permitted to move to its dotted line position against the stop 36ᶜ, whereby a predetermined degree of angular movement of contactor 26 is permitted prior to reclosure of contacts 37ᵃ, 37. Upon closure of said contacts 37ᵃ, 37 a circuit across lines L¹, L² is completed for the operating coil 38ᵃ of relay 38,—said circuit being obvious.

Resultant closure of contacts 38ᵈ of relay 38 provides an energizing circuit for the operating coil 81ᵃ of relay 81,—said circuit extending from line L¹ by conductors 46, 60, 67 and 82 through contacts 71ᵃ, 71ᵇ of limit switch 71 (which is then in closed position), conductor 83 through said coil 81ᵃ, conductor 111, contacts 38ᵈ, and conductor 44 to line L². Contacts 81ᵇ of relay 81 are thereupon closed to complete a circuit for the field winding 84 of motor 30 whereby valve 29 is moved in the reverse direction to its full open position,—said circuit extending from line L¹ by conductors 46, 60 and 67 through the armature of motor 30, conductor 68 through said field winding 84, through said relay contacts 81ᵇ, and by conductors 85, 69 and 58 to line L². Upon full open positioning of valve 29 nut 70 will have engaged projection 71ᵉ of limit switch 71 to cause opening of its contacts 71ᵃ, 71ᵇ whereby relay coil 81ᵃ is de-energized and the contacts 81ᵇ thereof opened to stop motor 30. At the same time contacts 71ᶜ, 71ᵈ of limit switch 71 will be opened to interrupt the short circuit of relay coil 72ᵃ, and the contacts 72ᵇ of relay 72 will close to complete a circuit for relay coil 77ᵃ,—which circuit may be traced from line L¹ by conductor 73 through contacts 78ᵃ, 78ᵇ of limit switch 78 (which is then in closed position), conductor 86 through said coil 77ᵃ, conductor 87, relay contacts 72ᵇ, conductor 88, relay contacts 38ᵉ and conductor 44 to line L².

Contacts 77ᵇ of relay 77 thereupon close to complete a circuit for effecting operation of motor 33 in a reverse direction,—said circuit extending from line L¹ by conductors 46, 54 and 47 through the armature of motor 33, conductor 48 through the other field winding 89, relay contacts 77ᵇ, and by conductors 90 and 76 to line L². Valve 32 is thus moved to its fully closed position, whereupon the traveling nut 55 engages the projection 78ᶜ of limit switch 78 to effect opening of contacts 78ᵃ, 78ᵇ, thus de-energizing relay coil 77ᵃ with consequent opening of relay contacts 77ᵇ for interruption of the circuit of motor 33.

As a result of the aforedescribed cycles of operation the several parts of the control system are returned to the positions thereof illustrated,—it being understood that rheostat contactor 26 is moved to different angular positions to vary the rate of energy supply to heater element 11 in accordance with variations in the volumetric rate of flow of the fluid. Also, as will be understood, the electric fluid meter is maintained solely effective for measuring the flow pending a reduction in the volumetric rate thereof to a value below approximately 3,000 cubic feet per hour,—in which event the elements are operable automatically in the manner aforedescribed to first effect full open positioning of valve 32 and subsequent full closed positioning of valve 29.

The aforedescribed arrangement whereby the parts of the electric fluid meter are maintained responsive to variations in the volumetric rate of flow of fluid, while the positive displacement meter 34 is rendered solely effective for measurement of the flow, has the advantage that the electric fluid meter is always immediately responsive to accurately measure the flow when control of the measurement thereof is transferred from meter 34 to the electric fluid meter. Moreover, such an arrangement provides simple and accurate means for controlling and insuring transfer of the measurement control from each flow meter to the other.

If desired a manually operable switch 91 may be provided for interrupting the energizing circuit of heater element 11 at will,—thus rendering the electric fluid meter entirely unresponsive to variations in the volumetric rate of flow;—a master switch 92 being also provided to permit disablement of the entire system. Assuming that lines $L^1$, $L^2$ are connected with a source of alternating current, a rectifier system 93 of well known form will be provided to insure a proper supply of unidirectional current to the Wheatstone bridge circuit.

The modified form of fluid measuring system illustrated in Fig. 2 is in many respects similar to that illustrated in Fig. 1, and like parts in the two figures have been given like characters of reference. In the device of Fig. 2 the necessity for a valve in the branch conduit $31^a$ has been eliminated, and the positive displacement meter 34 is therefore rendered effective at all times to measure at least a portion of the fluid flow,—the arrangement being such that upon a decrease in the volumetric rate of flow to below, say, 3,000 cubic feet per hour the valve 29 is closed automatically to render the meter 34 solely effective for measuring the flow, and thereafter upon an increase in the volumetric rate of flow to above, say, 4,000 cubic feet per hour the valve 29 will be automatically re-opened and the electric fluid meter rendered effective for measuring at least the major portion of the flow.

Thus assuming the electric fluid meter to have a maximum capacity for measuring 100,000 cubic feet of fluid per hour and the positive displacement meter 34 to have a maximum capacity for measuring approximately 5,000 cubic feet of fluid per hour, and further assuming a present volumetric rate of flow of about 60,000 cubic feet per hour (as represented by the relative position of contactor 26 of rheostat 27), it will be understood that valve 29 is in fully open position (as indicated by the position of traveling nut 70) and that the electric fluid meter and the positive displacement meter are each functioning to measure a portion of the total fluid flow.

Upon a decrease in the volumetric rate of flow to, say, below 3,000 cubic feet per hour the contactor 26 will have been moved in a counterclockwise direction to its extreme right hand position to correspondingly decrease the value of current supplied to the heater element 11. At the same time the disk 94 carried by shaft 35 will have been moved to a position wherein the notch $94^a$ in the periphery thereof registers with projection $37^b$ on contact $37^a$, whereby the latter is permitted to separate from contact 37. Opening of contacts $37^a$, 37 effects de-energization of operating coil $95^a$ of a relay 95, as will be obvious. This effects closure of contacts $95^b$ and opening of contacts $95^c$, $95^d$ and $95^e$ of said relay. Upon closure of contacts $95^b$ a circuit is completed for the operating coil $59^a$ of relay 59,—said circuit extending from line $L^1$ by conductors 96 and 97 through contacts $62^a$, $62^b$ of limit switch 62, conductor 98 through said relay coil $59^a$, conductor 99 through said contacts $95^b$, and by conductor 100 to line $L^2$. Relay contacts $59^b$ in closing complete an energizing circuit for winding 66 of motor 30,—said circuit extending from line $L^1$ by conductor 96 through the armature of said motor, conductor 101 through said field winding 66, thence through relay contacts $59^b$, and by conductor 100 to line $L^2$. Motor 30 thereupon operates in a direction to cause full closed positioning of valve 29, during which operation the traveling nut 70 permits reclosure of contacts $71^a$, $71^b$ and $71^c$, $71^d$ of limit switch 71 and subsequent opening of contacts $62^a$, $62^b$ of limit switch 62, thus de-energizing relay coil $59^a$ with consequent opening of relay contacts $59^b$ to interrupt said motor circuit.

Also upon opening of relay contacts $95^e$ the circuit of the current coil (represented by terminals $28^b$) of the integrating wattmeter 28 is interrupted to de-energize the heater element 11 whereby the electric fluid meter is rendered entirely unresponsive to variations in the volumetric rate of flow of the fluid. Also as will be apparent opening of said contacts $95^e$ interrupts the energy supply for the entire Wheatstone bridge circuit. In this manner the positive displacement meter 34 is rendered solely effective for measuring the fluid flow, and the same will remain so pending an increase in the volumetric rate of flow to, say, above 4,000 cubic feet per hour.

Thus I have shown a pressure responsive switch 102 having a set of normally open contacts $102^a$ carried by a diaphragm member $102^b$,—the upper surface of said diaphragm being connected through pipe $102^c$ with branch conduit $31^a$ at the inlet side of meter 34 and the lower surface of said diaphragm being connected through pipe $102^d$ with said branch conduit at the outlet side of said meter 34. Said pressure responsive switch 102 may be so constructed or calibrated as to provide for response thereof to close its contacts $102^a$ when the volumetric rate of flow through branch conduit $31^a$ increases to, say, 4,000 cubic feet per hour.

Upon closure of said contacts $102^a$ a circuit is completed for the operating coil $95^a$ of relay 95,—said circuit extending from line $L^1$ by conductors 96 and 103 through said contacts $102^a$, conductors 104 and 105 through said coil $95^a$ and by conductor 100 to line $L^2$. Consequent closure of contacts $95^c$ of relay 95 completes a circuit for the operating coil $81^a$ of relay 81,—said circuit extending from line $L^1$ by conductors 96 and 106 through contacts $71^a$, $71^b$ of limit switch 71, conductor 107 through said coil $81^a$, conductor 108 through relay contacts $95^c$, and by conductors 109 and 100 to line $L^2$. Relay contacts $81^b$ upon closure thereof complete an alternative circuit for motor 30,—said circuit extending from line $L^1$ by conductor 96 through the armature of said motor, conductors 101 and 110 through the field winding 84, and through relay contacts $81^b$ and conductor 100 to line $L^2$. Motor 30 is thus operated in a reverse direction to effect full open positioning of valve 29,—traveling nut 70 thereupon acting to cause opening of limit switch contacts $71^a$, $71^b$ whereby relay coil $81^a$ is de-energized and the contacts $81^b$ thereof reopened to interrupt the motor circuit connections.

At the same time relay contacts $95^e$ are reclosed to complete the circuit for the current coil of wattmeter 28, heater element 11, and the Wheatstone bridge. The electric fluid meter is thus rendered effective for measuring at least a major portion of the fluid flow, and the same will remain so effective pending a decrease in the volumetric rate of flow below the aforementioned value of 3,000 cubic feet per hour. In such event the elements will function in the manner aforedescribed to effect closure of valve 29 and disabling of the electric fluid meter.

It will be noted that here, as in the device of Fig. 1, the electric fluid meter is brought into service at a different volumetric rate of fluid flow as compared with the volumetric rate of flow at which it is cut out of service. This arrangement as aforestated is extremely desirable since it eliminates a "hunting" effect of the measurement controlling elements.

What I claim as new and desire to secure by Letters Patent is:

1. In a fluid metering system, in combination, a main conduit through which a fluid is adapted to flow, a valve in said main conduit and power-operated means for effecting movement of said valve to open or to closed position selectively, a branch conduit arranged to by-pass said valve, a valve in said branch conduit and power-operated means for effecting movement of said last mentioned valve to open or to closed position selectively, a meter of relatively large capacity located within said main conduit and a meter of relatively small capacity located within said branch conduit, control means for each of said power-operated means, said control means including means associated with said relatively large meter and operable automatically in response to variations in the rate of flow of said fluid to effect control of said valves whereby said relatively small meter is selectively rendered effective or ineffective, and means also associated with said relatively large meter and operable automatically to render the latter ineffective to measure the flow when said relatively small meter has been rendered effective.

2. In a fluid metering system, in combination, a conduit through which a fluid is adapted to flow, an electric fluid meter having parts thereof located within said conduit and normally operable to indicate and register the total flow of fluid through the latter, a valve in said conduit, power-operated means for effecting movement of said valve to open or to closed position selectively, a branch conduit arranged to by-pass said valve, a positive displacement meter of relatively small capacity located within said branch conduit, said power-operated means being subject to control by a part of said first mentioned meter to effect closing of said valve when the rate of flow decreases to a predetermined value, whereby said second mentioned meter is rendered effective for indicating and registering the entire flow of fluid, said first mentioned meter being self-controlled to render the latter ineffective for registering the flow under the conditions last mentioned, and said part of said first mentioned meter being also operable automatically in response to an increase in the rate of flow to a predetermined higher value to control said power-operated means for effecting re-opening of said valve, whereby said first mentioned meter is again rendered effective.

3. In a fluid metering system, in combination, a meter of relatively large capacity, a main conduit in which said meter is located, a valve also located in said main conduit, a branch conduit arranged to by-pass said valve, a second valve located within said branch conduit, a meter of relatively smaller capacity located within said branch conduit, power-operated means for each of said valves, and means including said first mentioned meter for controlling said power-operated means to effect opening of said second mentioned valve and closure of said first mentioned valve sequentially when the volumetric rate of flow of fluid decreases below a predetermined value and to effect opening of said first mentioned valve and closure of said second mentioned valve sequentially when the volumetric rate of flow of fluid increases above a different predetermined value, said means also acting to render said first mentioned meter ineffective for measuring the flow of fluid upon opening of said second mentioned valve.

4. In a fluid metering system, in combination, a main conduit through which a fluid is normally adapted to flow, an electric fluid meter of the heat-exchange type located within said conduit, a power-operated valve located within said conduit, a branch conduit communicating at each end thereof with said main conduit and arranged to by-pass said valve, a power-operated valve located within said branch conduit, a fluid meter of the positive-displacement type also located within said branch conduit, and means including said first mentioned meter for controlling said valves to insure open positioning of the first mentioned valve and closed positioning of the second mentioned valve when the volumetric rate of flow of said fluid exceeds a predetermined value, whereby said first mentioned meter is rendered solely effective for measuring the flow, said means also acting to insure open positioning of the second mentioned valve and closed positioning of the first mentioned valve when the volumetric rate of flow of said fluid falls below a different predetermined value and to render said first mentioned meter ineffective for measuring the flow under the conditions last mentioned, whereby said second mentioned meter is rendered solely effective for measuring said flow.

5. In a fluid metering system, in combination, a main conduit through which a gaseous fluid is adapted to flow, a branch conduit arranged to by-pass a portion of said main conduit, an electric fluid meter of relatively large capacity located within said main conduit, a fluid meter of relatively small capacity located within said branch conduit, a valve located within the aforementioned portion of said main conduit, a valve located within said branch conduit, power-operating means including a reversible electric driving motor for each of said valves, and control means for said electric driving motors, said control means being responsive to a decrease in the rate of flow of fluid below a predetermined value to effect operation of said motors for opening of said second mentioned valve and subsequent closing of said first mentioned valve, said control means also acting under the conditions last mentioned to render said first mentioned meter ineffective for measuring the flow, whereby said second mentioned meter is rendered solely effective for measuring said flow, said control means being also responsive to an increase in the rate of flow of fluid above a different predetermined value to effect operation of said motors for opening of said first mentioned valve and closing of said second mentioned valve, said first mentioned meter being simultaneously rendered solely effective for measuring said flow.

6. In a fluid metering system, in combination, a conduit through which a gaseous fluid is adapted to flow, a valve in said conduit, power-operated means including a reversible electric motor for effecting movement of said valve to open or to closed position selectively, a branch conduit arranged to by-pass said valve, a positive displacement meter of relatively small capacity located within said branch conduit and adapted to measure the flow of fluid through the latter, an electric fluid meter of the heat exchange type having parts thereof located within said first mentioned conduit, said electric fluid meter being normally adapted to indicate the volumetric flow of fluid therethrough, and means associated with said electric fluid meter and with said power-operated means and adapted to control the latter for effecting closure of said valve in response to a decrease in the volumetric rate of flow of fluid through said electric fluid meter below a predetermined value, said last mentioned means being also operable to simultaneously render said electric fluid meter ineffective for measuring the fluid flow, said positive displacement meter being rendered solely effective for measuring the volumetric flow in said first mentioned conduit under the conditions last mentioned.

7. In a fluid metering system, in combination, a conduit through which a gaseous fluid is adapted to flow, a valve in said conduit, power-operated means including a reversible electric motor for effecting movement of said valve to open or to closed position selectively, a branch conduit arranged to by-pass said valve, a positive displacement meter of relatively small capacity located within said branch conduit and adapted to measure the flow of fluid through the latter, an electric fluid meter of the heat exchange type having parts thereof located within said first mentioned conduit, said electric fluid meter being normally adapted to indicate the volumetric flow of fluid therethrough, means associated with said electric fluid meter and with said power-operated means and adapted to control the latter for effecting closure of said valve in response to a decrease in the volumetric rate of flow of fluid through said electric fluid meter below a predetermined value, said last mentioned means being also operable to simultaneously render said electric fluid meter ineffective for measuring the fluid flow, said positive displacement meter being rendered solely effective for measuring the volumetric flow in said first mentioned conduit under the conditions last mentioned, and associated means operable automatically in response to an increase in the volumetric rate of flow of fluid through said positive displacement meter above a different predetermined value and adapted to control said power-operated means for effecting re-opening of said valve and for simultaneously rendering said electric fluid meter effective for measuring the volumetric flow of fluid therethrough.

8. In a fluid metering system, in combination, a conduit through which a gaseous fluid is adapted to flow, a valve in said conduit, power-operated means including a reversible electric motor for effecting movement of said valve to open or to closed position selectively, a branch conduit arranged to by-pass said valve, a positive displacement meter of relatively small capacity located within said branch conduit and adapted to measure the flow of fluid through the latter, an electric fluid meter of the heat exchange type having parts thereof located within said first mentioned conduit, said electric fluid meter being normally adapted to indicate the volumetric flow of fluid therethrough, means associated with said electric fluid meter and with said power-operated means and adapted to control the latter for effecting closure of said valve in response to a decrease in the volumetric rate of flow of fluid through said electric fluid meter below a predetermined value, said last mentioned means being also operable automatically to simultaneously render said electric fluid meter ineffective for measuring the fluid flow, said positive displacement meter being rendered solely effective for measuring the volumetric flow in said first mentioned conduit under the conditions last mentioned, said means associated with said electric fluid meter being also operable automatically in response to an increase in the volumetric rate of flow of fluid through said positive displacement meter above a different predetermined value and adapted to control said power-operated means for effecting re-opening of said valve and for simultaneously rendering said electric fluid meter effective for measuring the volumetric flow of fluid therethrough, and means controlled by said associated means and operable automatically under the conditions last mentioned to render said positive displacement meter ineffective for measuring any portion of the fluid flow.

9. In a fluid metering system, in combination, a registering meter of relatively large capacity, a main conduit in which said meter is located, a valve also located within said main conduit, a branch conduit arranged to by-pass said valve, a second valve, said second valve being located within said branch conduit, a registering meter of relatively smaller capacity located within said branch conduit, power-operated means including a reversible electric driving motor for each of said valves, electric switching means controlled by a moving part of said first mentioned meter in response to a decrease in the volumetric rate of flow of fluid below a predetermined value to effect full open positioning of said second mentioned valve by its respective driving motor, means including a limit switch associated with said second mentioned valve to thereupon initiate operation of the driving motor of the first mentioned valve in a direction to effect full closed positioning of the latter, said electric switching means being also operable by said moving part in response to an increase in the volumetric rate of flow of fluid above a higher predetermined value to effect reverse operation of the driving motor of said first mentioned valve whereby the latter is moved to full open position, means including a limit switch associated with said first-mentioned valve to thereupon initiate operation of the driving motor of the second mentioned valve in a direction to effect full closed positioning of the latter, said large capacity meter having parts thereof responsive to variations in the volumetric rate of flow of fluid under all conditions, and said large capacity meter having parts thereof subject to control by said electric switching means whereby said large capacity meter is rendered ineffective for measuring the volumetric flow of fluid except when said first mentioned valve is in open position.

ROBERT O. PERRINE.